United States Patent [19]
Parish

[11] Patent Number: 5,549,969
[45] Date of Patent: Aug. 27, 1996

[54] ENHANCED SURFACE FOR GLASS FIBER REINFORCED PLASTICS

[75] Inventor: David M. Parish, Loveland, Ohio

[73] Assignee: Fibre Glass-Evercoat Company, Inc., Cincinnati, Ohio

[21] Appl. No.: 440,069

[22] Filed: May 12, 1995

[51] Int. Cl.⁶ .................. B32B 5/16; B32B 7/00
[52] U.S. Cl. .................. 428/241; 428/245; 428/265; 428/268; 428/283
[58] Field of Search .................. 428/245, 241, 428/268, 265, 283

[56] References Cited

U.S. PATENT DOCUMENTS

| | | |
|---|---|---|
| 4,011,195 | 3/1977 | Self .................. 260/40 R |
| 4,557,889 | 12/1985 | Masuda et al. . |
| 5,358,779 | 10/1994 | McGarry . |
| 5,371,117 | 12/1994 | Parish et al. . |
| 5,374,669 | 12/1994 | Parish et al. . |

*Primary Examiner*—James Withers
*Attorney, Agent, or Firm*—Killworth, Gottman, Hagan & Schaeff

[57] ABSTRACT

A laminate having enhanced surface properties is prepared by coating a fiber reinforced plastic (FRP) part with a sprayable, high solids, low volatiles coating. The coating comprises a first filler/glazing component formed from a mixture of a resin, a filler, a mixture of thixotropic clays, activated fumed silica, a phosphosilicate, and an organic solvent. The coating has a second catalyst component. The coating as applied to the FRP part has a thickness of up to 9 mils without sagging, running or cracking.

18 Claims, No Drawings

ENHANCED SURFACE FOR GLASS FIBER REINFORCED PLASTICS

BACKGROUND OF THE INVENTION

The present invention relates to a sprayable coating composition applied to fiber reinforced plastic (FRP) to enhance the surface of molded FRP parts and better prepare those parts for further coating or painting applications.

It is known that various fiber reinforced plastic (FRP) parts such as cured sheet molded compounds (SMC) can form cracks and sink marks which affect surface appearance. SMC is produced from unsaturated polyester or vinyl ester resin primarily. It is formulated with calcium carbonate filler, fiberglass for reinforcement, one or two catalyst, and usually an internal release agent like zinc stearate. The material is "B-staged" (thickened to a semi-solid) in long sheets which are rolled up for storage. When ready to mold, it is cut to mold size, placed into the mold which experiences clamp pressure and heat which fully cures the product in its final shape. Cycle times are usually 3–5 minutes depending on part size. After molding the "Stamped" parts usually have flashing that needs to be removed (usually by sanding), and/or may experience some type of processing like routing-out access holes, etc. This leaves raw edges or spots on the molded piece. When conventional paints are used, solvent can become trapped in these areas and subsequently "pop-out" when heated during normal baking processes. This creates a great deal of unusable parts. This phenomenon is greatly enhanced/accelerated by use of glass bubbles in the SMC formula to provide "low density" parts in an effort to reduce vehicle weight.

Accordingly, it has been suggested that a thin coating made from a liquid rubber and liquid epoxy polymer be used as a primerlike coating to inhibit propagation of micro cracks, reduce porosity and reduce sink marks in FRP parts and to provide a suitable smooth surface for automotive body panel applications that serves as a substrate for further paint applications. See, McGarry U.S. Pat. No. 5,358,779, issued Oct. 25, 1994.

It is also known through the assignee of the present application that a sprayable, high solids, low-volatile filler composition may be used as a coating on a variety of substrates including metals such as iron and aluminum, concrete, wood, fiberglass and polyester fillers, etc. See, for example, Parish et al U.S. Pat. No. 5,371,117, issued Dec. 6, 1994 which discloses a sprayable filler composition having a first filler/glazing component formed from a mixture of a resin, a filler, a mixture of thixotropic clays, activated fumed silica, hollow glass microspheres, and a ketone solvent and having a second catalyst component.

While Parish et al discloses that the sprayable, high solids, low-volatile filler composition may be used on a variety of substrates, no mention is made of molded fiber reinforced plastic (FRP) parts. Nor would one necessarily expect a high solids, low-volatile filler composition to adhere to a molded fiber reinforced plastic (FRP) part. When such a part comes out of the mold it is hard to find a coating which will adequately adhere to it. Most coatings have difficulty adhering to an unprepared SMC surface due to the internal mold release commonly used. Likewise, as pointed out in McGarry, it is difficult to find a coating which will not only adhere but also reduce propagation of micro cracks, reduce porosity, reduce sink marks and otherwise enhance surface appearance of molded FRP parts. McGarry teaches that a rubbery coating is necessary for that purpose. But, rubbery coatings have other problems in terms of cure time, hardness, and durability.

Accordingly, the need remains for an improved coating for molded FRP parts to enhance the surface of the molded FRP part and better prepare the part for further coating or painting application.

SUMMARY OF THE INVENTION

That need is met by the present invention. Thus, there is provided a laminate having an enhanced surface comprising a fiber reinforced plastic (FRP) and a coating which, as applied, has a) a filler/glazing component comprising a mixture of from about 20% to about 50% by weight of a resin selected from the group consisting of vinyl ester resins, and vinyl ester resins in combination with polyester resins; from about 5% to about 35% by weight of a sprayable filler selected from the group consisting of calcium carbonate, talc, and combinations thereof, from about 1% to a about 15% by weight of a mixture of thixotropic clays, from about 0% to about 2% by weight activated fumed silica, from about 0–10% calcium strontium zinc phosphosilicate, from about 0–2% of an acellerator such as dimethyl aniline, cobalt napthenate, copper napthenate, potassium hexanoate, dimethyl para-tolinidine, cobalt neodecanate, and mixtures thereof; from about 0% to about 20% by weight of an organic solvent, and b) a catalyst component. The catalyst component, which may be present in an amount of from about 1–50% and preferably about 2 to 4% by weight of the total coating as applied (i.e. preferably the filler/glazing component comprises about 96–98% of the coating and the catalyst component comprises about 2–4%), is preferably a methyl ethyl ketone peroxide or a benzoyl peroxide.

The filler/glazing component may further include about 0–4% by weight of a coloring agent such as titanium dioxide, black iron oxide, or mixtures thereof; and from about 0–12% by weight of styrene monomer.

When the resin in the filler/glazing component is a combination of a vinyl ester resin and a polyester resin (which polyester resin is preferably present in an amount of 2–10% by weight of the filler/glazing component), there may also be present 0–8% of an acrylic resin by weight of the filler/glazing component.

This coating which functions as a primerlike coating could replace in-mold coatings presently used to enhance surface appearance, reduce porosity, and reduce sink marks on molded products from thermosetting FRP from sheet molded compound (SMC), bulk molding compounds (BMC), and thick molding compounds (TMC). Specifically, this invention is useful in automotive body parts, furniture, sporting goods, chemical processing equipment, and the like.

DETAILED DESCRIPTION OF THE INVENTION

The first layer of the laminate is a fiber reinforced plastic (FRP) made from a thermoset resin such as sheet molding compound (SMC). The FRP is generally made from a composition, which may be a polyester resin or vinyl ester resin that are crosslinkable with ethylenically unsaturated monomers such as styrene. Reinforcing fibers and assorted fillers are often added to increase strength and rigidity. Additional resins, processing aids, colorants and environmental protectorants can also be used.

The matrix material of the invention is generally an unsaturated polyester resin. One preferred resin is based on the reaction of 1,2 propylene glycol, and an ethylenically unsaturated diacid or anhydride. Other suitable unsaturated polyester resins which can be utilized in the present invention are well known and include products of the condensation reaction of low molecular weight diols, (that is, diols containing from about 2 to 12 carbon atoms and desirably from 2 to 6 carbon atoms) with dicarboxylic acids or their anhydrides containing from 3 to 12 carbon atoms and preferably from 4 to 8 carbon atoms provided that at least 50 mole percent of these acids or anhydrides contain ethylenical unsaturation. Examples of diols include 1,2-propylene glycol, ethylene glycol, 1,3-propylene glycol, diethylene glycol, di-1,2 -propylene glycol, 1,4-butanediol, neopentyl glycol, and the like. A preferred diol is 1,2 propylene glycol. Mixtures of diols may also be advantageously used. Preferred acids include fumaric acid, maleic anhydride. Often, mixtures of acids and/or anhydrides are utilized with the preferred acids or anhydrides and such compounds include phthalic anhydride, isophthalic acid, terephthalic acid, adipic acid, glutaric acid, and the like, catalyzed by compounds such as organotitanates and organo tin compounds such as tetrabutyl titanate or dibutyl tin oxide, and the like.

Various other types of unsaturated polyesters can be utilized. Another type is described in R. J. Herold U.S. Pat. No. 3,538,043 which is hereby fully incorporated by reference. Typically, the polyesters are made by interpolymerization of maleic anhydride with oxiranes substituted with alkyls containing from 0 to 4 carbon atoms. Examples of oxiranes include ethylene oxide, propylene oxide, and butylene oxides. In addition to maleic anhydride, other anhydrides can be utilized in amounts up to 50 mole percent (i.e. from 0 to 50 mole percent) of the total anhydride charge, wherein said anhydride has from 4 to 10 carbon atoms, such as phthalic anhydride, nadic anhydride, methyl nadic anhydride, tetrahydrophthalic anhydride, succinic anhydride, and cyclohexane-1,2-dicarboxylic acid anhydride. The molar ratio of oxirane to anhydride can be from about 1.0 to about 2.0, and preferably from about 1.0 to about 1.3.

In the preparation of the unsaturated polyesters from oxiranes and anhydrides, small amounts from about 5 to about 30 parts by weight per 100 parts by weight of the polyester forming monomers of initiators are utilized. Examples of specific initiators include polyols, for example diols, triols, tetrols, having from 2 to 12 carbon atoms, or dicarboxylic acids containing from 3 to 10 carbon atoms, as for example fumaric acid, succinic acid, glutaric acids, and adipic acid. The molecular weight of the polyol is generally less than 500, preferably less than 200. Diols and dicarboxylic acid initiators result in linear, difunctional polyester chains with an average of two hydroxyl end groups per polymer chain. Triols produce polyester chains with an average of 3 arms and 3 hydroxyl end groups, and tetrols result in 4 arm chains with 4 hydroxyl end groups. Various catalysts can be utilized such as a zinc hexacyano cobaltate complex, and the like, as described in U.S. Pat. No. 3,538, 043.

Regardless of whether an unsaturated polyester made from an oxirane or diol is utilized, the molecular weight thereof is from about 1,000 to about 10,000 and preferably from about 1,200 to about 5,000. The polyester portion of the solution of polyester resin in ethylenically unsaturated monomer can be present from about 50 to about 80 and preferably about 60 to about 70 weight percent based on the total polyester resin weight of the polyester and ethylenically unsaturated monomers. The polyester resin, consisting of the polyester and ethylenically unsaturated monomers, can be from about 10 percent to about 80 percent by weight, and preferably 10 to about 30 percent of the composite fiber reinforced plastic.

Another important component of a typical molding composition of the present invention are ethylenically unsaturated monomers or crosslinking agents such as a polymerizable vinyl or allyl compounds, such as a vinyl substituted aromatic having from 8 to 12 carbon atoms, as for example styrene, a preferred monomer, vinyl toluene, divinyl benzene, diallyl phthalate, and the like; acrylic acid esters and methacrylic acid esters wherein the ester portion is an alkyl having from 1 to 10 carbon atoms such as methyl acrylate, ethyl acrylate, N-butyl acrylate, 2-ethyl-hexyl acrylate, methyl methacrylate, ethylene glycol dimethacrylate trimethylolpropane trimethacrylate, and the like. Other unsaturated monomers include vinyl acetate, diallyl maleate, diallyl fumarate, vinyl propionate, triallycyanate, and the like. Mixtures of the above compounds can also be utilized. The total amount of the unsaturated monomers generally varies from about 20 percent to about 50 percent and desirably from about 30 percent to about 40 percent by weight based upon the total weight of the ethylenically unsaturated monomers and the polyester.

The fiber can generally, be any reinforcing fiber such as glass, aramid nylon, polyester, graphite, boron, and the like. Fiber structure suitable for incorporation in the matrix include generally individual fibers, various types of woven fibers, or any general type of nonwoven fibers. Included with the woven class is any general type of woven fabrics, woven roving, and the like. Generally included within the nonwoven class is chopped strands, continuous filaments or rovings, reinforcing mats, nonreinforcing random mats, fiber bundles, yarn, non-woven fabrics, etc. Coated fiber bundles, comprising about 5 to about 50 or 150 strands, each having about 10 to about 50 fibers, highly bonded together with a conventional sizing agents such as various amino silanes, are preferred. The fiber structure may be randomly distributed within the matrix or be arranged in selected orientations such as in parallel or cross plies or arrange din mats or woven fabrics, etc. The fibers may comprise from about 5 percent up to about 85 percent by weight of the composite and preferably from 20 percent to 50 percent by weight of the composite. The specific quantity of fiber structure in the composite can be varied consistent with the physical properties desired in the final composite molded article.

Various other components or additives can optionally be utilized to form the molding compound composition. For example, various thermoplastic polymers (low profile or low shrinkage compound) can be utilized. Typical low profile compounds include polyvinyl acetate, saturated polyesters, polyacrylates or methacrylates, saturated polyester urethanes, and the like. The amount of such polymers is from about 10 parts by weight to about 50 parts by weight being preferred based upon the weight of unsaturated polyester and the amount of ethylenically unsaturated monomer in the mixture. Other additives which can also be utilized include internal mold release agents such as zinc stearate; mineral fillers such as calcium carbonate, Dolomite, clays, talcs, zinc borate, perlite, vermiculite, hollow glass bubbles, solid glass microspheres, hydrated alumina, and the like. Generally, mineral fillers can be used in weight percentages of the total composition up to 80 and desirably from about 20 to about 70, such that a final composition could be made up primarily of filler.

In addition to polyesters, other suitable matrix materials include vinyl ester resins. The general structure of a typical vinyl ester resin is

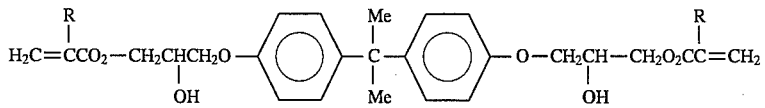

where R is a hydrogen atom or an alkyl group. Vinyl ester resins are prepared by reacting epoxy resins such as the addition products of 1-chloro-2,3-epoxypropane with 2, 2'-bis(4-hydroxyphenyl)propane with either methacrylic or acrylic acid. The terminal unsaturation can be crosslinked with styrene in the same fashion as an unsaturated polyester. These compounds can be substituted on an equivalent weight basis for the unsaturated polyester resins of this invention for up to 100 percent of the unsaturated polyester resin component.

Conventional catalysts can be used to cure the matrix. Examples of such catalysts for the cure of unsaturated polyester or vinyl ester resins include organic peroxides and hydroperoxides such as benzoyl peroxide, dicumyl peroxide, cumene hydroperoxide, paramethane hydroperoxide, and the like, used alone or with redox systems; diazo compounds such as azobisisobutyronitrile, and the like; persulfate salts such as sodium, potassium, and ammonium persulfate, used alone or with redox systems; and the use of ultraviolet light with photosensitive agent such as benzophenone, triphenylphosphine, organic diazos, and the like. The amounts of these catalysts generally varies from about 0.1 to about 5; and desirably from about 0.2 to about 2 parts by weight based upon 100 parts by weight of unsaturated polyester, vinyl ester resins, and ethylenically unsaturated monomers.

The commercial manufacture of FRP depends on the particular molding operations to be performed and the structure of the molded part. The general requirements are that the resin components be intimately mixed and any fillers or fibers are well distributed in the resin and their surfaces wetted or contacted with the resin to assure strong interfacial bonding between the components. These mixing and molding operations are well known. In a preferred form of an SMC, the polyester resin with its additives and catalysts is well mixed. Chopped fiberglass fibers randomly oriented are mixed into the resin. The composite material is further mixed to assure good fiber wetting and is sandwiched into a sheet between two carrier films. This sheet is collected and allowed to mature. The carrier films are removed before molding. The SMC sheet is molded in compression molds at pressures up to 2000 psi and temperatures up to 350° F. (177° C.). The molding temperature depends on the part thickness, the in-mold time, and the catalyst chosen for polymerizing the ethylenically unsaturated monomer and crosslinking the polyester resin.

The coating of the second layer of the laminate, as applied, comprises a first filler/glazing component including a resin selected from the group consisting of vinyl ester resins and the combination of vinyl ester resins and polyester resins. Such resins provide fast curing and good adhesion. Suitable polyester resins are available from Reichhold Chemicals, Inc. of Research Triangle Park, Durham, N.C. under the Polylite trademark and the designation 32-374, which is a mixture of a maximum of 67% of a proprietary polyester resin and 38% of a styrene monomer (CAS #100-42-5), and which has a boiling point of 295° F., a volatile percentage of 33–38%, a vapor density heavier than air and a specific gravity of 1.10. Suitable vinyl ester resins include 8084 vinyl ester, which is a mixture of 40–50% of a styrene monomer (CAS #000100-42-5) and the balance vinyl ester resin (CAS #068492-68-2), and which has a boiling point of 294° F., a vapor pressure of 7 mmHg at 20° C., a vapor density of 3.6 based on styrene, and a specific gravity of 1.010–1.035, and 411-35 vinyl ester, which is a mixture of 35–50% of a styrene monomer (CAS #000100-42-5) and the balance vinyl ester resin (CAS #036425-16-8), and which has a boiling point of 294° F., a vapor pressure of 7 mmHg at 20° C., a vapor density of 3.6 based on styrene and a specific gravity of 1.025–1.075, both available from Dow Chemical Company of Midland, Mich. under the Derakane trademark.

A styrene monomer is preferably included in the filler/glazing component to increase the rate of polymerization and to reduce the viscosity of the composition. However, it should be noted that in instances where vinyl esters alone are used as the resin, an encapsulated petroleum based wax may be used in place of some of the styrene. Suitable waxes include BYK S-740 available from Byk Chemie.

The thixotropic clays suitable for use in the filler/glazing component of the present invention include prewet and dry organo clays. A suitable prewet clay is available from Rheox, Inc. under the trade name MPA-60-x. A preferred dry clay is quaternary ammonium bentonite, available from United Catalysts, Inc. under the trade name Advitrol 6–8. The prewet clay acts as an antisettling agent and also provides thixotropic properties to the composition while the dry clay provides fast shear viscosity, and also provides thixotropic properties.

Fumed silica is included in the filler/glazing component to provide fast viscosity, and also acts as a thixotropic agent. The fumed silica is commercially available from DeGussa Company under the trade name Aerosil 200. The fumed silica is preferably activated by the addition of ethylene glycol.

The preferred fillers for the filler/glazing component of the present invention include talc and calcium carbonate. These fillers provide thixotropic properties to the composition and also aid in providing sanding properties to the coated substrate. A preferred talc is MP25-38 available from Genstar under the trade name Camel Wire.

Preferably, the filler/glazing component includes a coloring agent to form a colored finish. Suitable coloring agents include black iron oxide, available from Pfizer, and titanium dioxide (Rutile), available from SCM Chemicals under the designation Tiona RCL-9.

The filler/glazing component also preferably includes accelerating agents to speed up the curing time. Suitable accelerators include dimethyl aniline, available from Dupont under the designation,N DMA, and cobalt naphthenate or cobalt neodecanate, available from Mooney Chemical, Inc. under the designation TEN-CEM.

The addition of calcium strontium zinc phosphosilicate to the filler/glazing component helps assure the adhesion of the coating to the molded FRP part and adds to the durability of the coating. Thus the two most unique properties of the coating are its superior adhesion (unlike most unsaturated compounds) and its exceptional corrosion resistance. While it is the combination of ingredients in the filler/glazing component which gives that result, it is believed that the phosphosilicate is a major contributor in that regard.

The preferred organic solvent is a 50–50 blend of acetone and ethyl acetate.

Based on the foregoing, the preferred filler/glazing component of the coating comprises: from about 20% to about 50% by weight of a resin selected from the group consisting of unsaturated vinyl ester resins, a mixture of a vinyl ester resin and a polyester resin; from about 5% to about 35% by weight of a filler; from about 1% to about 15% by weight of a mixture of thixotropic clays; from about 0% to about 2% by weight activated fumed silica; from about 0 to 10% by weight calcium strontium zinc phosphosilicate; 0 to 2% of an accelerator selected from the group consisting of dimethyl aniline, cobalt napthenate, copper napthenate, potassium hexonate, dimethyl para toluidine, cobalt neodecanate, or mixtures thereof and from about 0% to 20% by weight of an organic solvent. The filler/glazing component also includes optionally from 0 to 12% of a styrene monomer, from 0 to 4% of a coloring agent selected from the group consisting of titanium dioxide, black oxide, or mixtures thereof, and from 0 to 8% acrylic resin when the main resin is a combination of a vinyl ester resin and a polyester resin.

The coating further includes as the catalyst component from 1 to 50% and preferably about 2 to 4% of a catalyst selected from the group consisting of methyl ethyl ketone peroxide, benzoyl peroxide, boron trifluoride, polyamine, mercaptan, isobiurate, and isocyanurate.

More preferably, the filler glazing/component comprises: a combination of 20–30% by weight of the overall filler/glazing components of a vinyl ester resin and 2–10% by weight of a polyester resin, 5–10% by weight of a styrene monomer, 0.2 to 4% by weight of a coloring agent selected from titanium dioxide, black oxide, or mixtures thereof, 0.8–2% of an accelerator selected from the group consisting of dimethyl aniline, cobalt naphthenate, copper napthenate, potassium hexanoate, dimethyl para toluidine, cobalt neodeoanate, or mixtures thereof; from about 25–35% by weight of a filler such as talc; from about 1–4% by weight of a mixture of thixotropic clays, from about 0.5–2% by weight fumed silica, from about 1–10% by weight calcium strontium zinc phosphosilicate, from about 0–0.8% acrylic resin, and from about 10–15% solvent.

The coating contains as a second component a preferred amount of about 2–4% by weight of the coating of a catalyst component.

The preferred coating of the present invention is applied as indicated in U.S. Pat. No. 5,371,117 which is hereby incorporated by reference and is dry to touch in 10 minutes, dry to handle in 30 minutes, and recoatable in one hour. The two most unique properties are its superior adhesion to many various substances (unlike most unsaturated compounds), and its exception corrosion resistance. This coating has shown superior crosshatch adhesion to many dissimilar substrates. Also, scribed untopcoated material spray applied over metal at no more than 2½–3 mils dry coat weight exhibited 1500+ hours resistance to standard 5% Harshaw Salt Fog per ASTM B-117 with little or no degradation, no rust creepage beyond the scribe, etc. This allows this coating to provide such a high degree of use flexibility, that it sets it as uncommon to most coatings and certainly unsaturated resin based coatings.

This coating also has high build capabilities when compared to conventional primers/highbuild primers. They are generally only capable of 0.8–2.5 mils of deposition, where the present coating can build up to 9 mils in subsequent wet on wet coats without sagging or running and without causing mud-cracking due to deposition or otherwise greatly affect the cure of the coating.

Because the coating has an uncommonly high pigment volume concentration, it has the ability to fill and bridge all the areas of concern, even "low-density" material, thereby eliminating the solvent popping problems. Also, it has exceptional adhesion to unprepared SMC as tested via ASTM sanctioned cross-hatch adhesion test.

While certain representative embodiments and details have been shown for purposes of illustrating the invention, it will be apparent to those skilled in the art that various changes in the product disclosed herein may be made without departing from the scope of the invention, which is defined in the appended claims.

What is claimed is:

1. A laminate comprising:
    a fiber-reinforced thermoset substrate comprising a cured polyester resin or vinyl ester resin, or combinations thereof and from 5 to 85 percent by weight fibers, based on the weight of the substrate; and
    a coating applied thereto, which coating as applied comprises:
        a) a filler/glazing component comprising a mixture of from about 20% to about 50% by weight of a resin selected from the group consisting of vinyl ester resins and vinyl ester resins in combination with polyester resins, from about 5% to about 35% by weight of a sprayable filler selected from the group consisting of calcium carbonate, talc, and combinations thereof,
        from about 1% to about 15% by weight of a mixture of thixotropic clays,
        from about 0% to about 2% by weight activated fumed silica,
        from about 1–10% by weight of a phosphosilicate,
        from about 0–2% by weight of an accelerator, and
        from about 0% to about 20% by weight of an organic solvent, and
        b) a catalyst component, wherein said coating has a thickness of up to 9 mils without sagging, running or cracking.

2. A laminate of claim 1, wherein said fiber-reinforced thermoset substrate is comprised of unsaturated polyester resin.

3. A laminate of claim 1, wherein said fiber-reinforced thermoset substrate comprises a sheet molding compound, bulk molding compound, or thick molding compound cured into a molded product.

4. A laminate of claim 3, wherein said fiber-reinforced thermoset substrate comprises a fiberglass reinforced polyester or fiberglass reinforced blend of polyester and vinyl ester resins.

5. A laminate of claim 1, wherein said fiber-reinforced thermoset substrate is a cured body panel for a vehicle.

6. The laminate of claim 1 wherein said catalyst component is selected from the group consisting of methyl ethyl ketone peroxide and benzoyl peroxide.

7. The laminate of claim 6 wherein said catalyst component comprises from about 2 to 4% of said coating.

8. The laminate of claim 1 wherein said filler/glazing component further includes a coloring agent selected from titanium dioxide, black iron oxide, or mixtures thereof.

9. The laminate of claim 8 wherein said coloring agent comprises about 0.2 to 4% of said filler/glazing component.

10. The laminate of claim 1 wherein said accelerator is selected from the group consisting of dimethyl aniline, cobalt naphthenate, copper naphthenate, potassium hexanoate, dimethyl para toluidine, cobalt neodecanate, and mixtures thereof.

11. The laminate of claim 10 wherein said accelerator comprises from about 0.2 to 2% of said filler/glazing component.

12. The laminate of claim 1 wherein said filler/glazing component further includes 0–12% styrene monomer by weight of said filler/glazing component.

13. The laminate of claim 1 wherein said solvent is a blend of 50% acetone and 50% ethyl acetate.

14. The laminate of claim 13 wherein said solvent comprises 10–15% by weight of said filler/glazing component.

15. A laminate comprising:
a fiber-reinforced thermoset substrate comprising a cured polyester resin or vinyl ester resin, or combinations thereof and from 5 to 85 percent by weight fibers, based on the weight of the substrate; and
a coating applied thereto, which coating as applied comprises:
 a) a filler/glazing component comprising a mixture of
  from about 20% to about 50% by weight of a combination of vinyl ester resin and polyester resin, wherein said polyester resin comprises by weight 2–10% of said filler/glazing component,
  from about 5% to about 35% by weight of a sprayable filler selected from the group consisting of calcium carbonate, talc, and combinations thereof,
  from about 1% to about 15% by weight of a mixture of thixotropic clays,
  from abut 0% to about 2% by weight activated fumed silica,
  from about 0–10% by weight calcium strontium zinc phosphosilicate,
  from about 0–2% by weight of an accelerator, and
  from about 0% to about 20% by weight of an organic solvent; and
 b) a catalyst component, wherein said coating has a thickness of up to 9 mils without sagging, running or cracking.

16. The laminate of claim 15 wherein said filler/glazing component further includes 0–8% of an acrylic resin by weight of said filler/glazing component.

17. The laminate of claim 1, wherein said phosphosilicate is calcium strontium zinc phosphosilicate.

18. A laminate comprising:
a fiber-reinforced thermoset substrate comprising a cured polyester resin or vinyl ester resin, or combinations thereof and from 5 to 85 percent by weight fibers, based on the weight of the substrate; and
a coating applied thereto, which coating as applied comprises:
 a) a filler/glazing component comprising a mixture of
  20–30% by weight of a vinyl ester resin,
  2–10% by weight of a polyester resin,
  5–10% by weight of a styrene monomer,
  0.2 to 4% by weight of a coloring agent,
  0.8–2% by weight of an accelerator,
  25–35% by weight of a sprayable filler selected from the group consisting of calcium carbonate, talc, and combinations thereof,
  1–4% by weight of a mixture of thixotropic clays,
  0.5–2% by weight activated fumed silica,
  1–10% by weight of a phosphosilicate,
  0–0.8% acrylic resin, and
  10–15% by weight of an organic solvent, and
 b) a catalyst component, wherein said coating has a thickness of up to 9 mils without sagging, running or cracking.

* * * * *